UNITED STATES PATENT OFFICE.

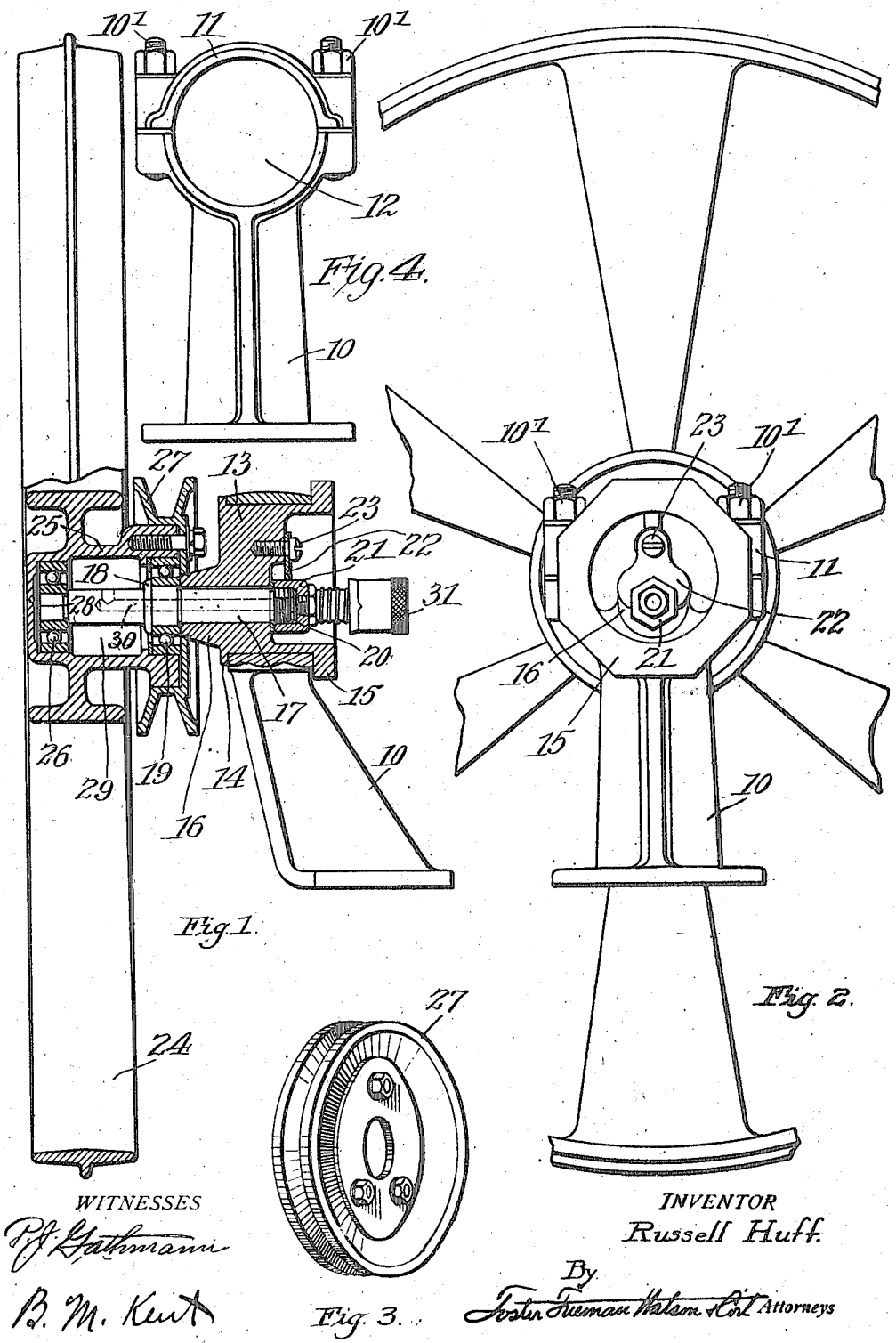

RUSSELL HUFF, OF DETROIT, MICHIGAN, ASSIGNOR TO PACKARD MOTOR CAR COMPANY, OF DETROIT, MICHIGAN, A CORPORATION OF MICHIGAN.

FAN-MOUNTING.

1,148,514.      Specification of Letters Patent.      Patented Aug. 3, 1915.

Application filed August 9, 1912. Serial No. 714,287.

*To all whom it may concern:*

Be it known that I, RUSSELL HUFF, a citizen of the United States, residing at Detroit, county of Wayne, State of Michigan, have invented certain new and useful Improvements in Fan-Mountings, of which the following is a specification.

This invention relates to motor vehicles and more particularly to adjustable means for supporting the fan.

The objects of the invention are to provide a comparatively simple construction in which the driving pulley for the fan is located contiguous to the fan and the parts are supported on a member which is eccentrically mounted in a bracket, whereby the position of the parts may be adjusted to take up slack in the driving belt.

The features of novelty will be apparent from the following description taken in connection with the accompanying drawings, in which:

Figure 1 is a vertical section of a fan and its supporting means embodying the invention. Fig. 2 is a rear view of the parts shown in Fig. 1. Fig. 3 is a perspective view of the driving pulley; and Fig. 4 is an elevation of the supporting bracket alone.

In the drawings 10 indicates the supporting bracket which may be secured on the front part of the motor (not shown). The upper part of the bracket 10 has secured thereto by means of bolts 10' a cap 11 which forms with the bracket a cylindrical opening 12 in which is arranged an adjustable member 13 having at its ends the flanges 14 and 15 for holding the member 13 in position. The flange 15 is preferably of hexagon or octagon shape as shown so that a wrench may be attached thereto for the purpose of turning the member 13. The member 13 has an eccentric boss 16 through which extends an opening having arranged therein a spindle 17 provided with a flange 18, and between this flange and the end of the eccentric boss 16 is arranged a roller bearing 19. The spindle 17 has one end threaded, as at 20, to receive a nut 21, by means of which the spindle may be secured in the member 13.

For the purpose of holding the nut 21 in position a lock 22 is arranged in engagement therewith and secured to the member 13 by means of a screw 23.

A fan 24 is provided with a hub 25 which is mounted on the roller bearing 19 and on a floating roller bearing 26 carried by the end of the spindle 17.

A driving pulley 27 is secured to the hub 25 and coöperates with the boss 16 of the member 13 to prevent dust from getting into the bearing 19. The outer end of the hub 25 is closed by a plate 28 which may be formed integral with the hub as shown, or may be detachable therefrom.

From Fig. 1 it will be observed that an annular chamber 29 is provided in the hub 25 between the bearings 19 and 26 and for the purpose of lubricating these bearings I supply this chamber with lubricant by means of a passage 30 extending through the spindle 17.

A lubricating cup 31 is secured to the nut 21 and supplies lubricant to the passage 30.

It will be observed that the position of the spindle 17 and the parts carried thereby may be readily adjusted by loosening the bolts 10' and turning the member 13. It will also be observed that the pulley 27 is arranged directly in line with the bearing 19 so that the side thrust due to the pull of the driving belt will be taken directly by this bearing.

Since the bearing 26 is of the floating type or, in other words, free to move in an axial direction and the bearing 19 is rigidly held in position the latter bearing will take up the end thrust due to the operation of the fan.

Having thus described the invention what is claimed as new is:

1. The combination of a supporting member, a spindle secured in said member and having a flange, a roller bearing on said spindle and held between said supporting member and said flange, a hub member having one end carried by said bearing and the other end rotatably mounted on the end of said spindle, the hub member having an integral end wall adjoining the end of said spindle, and detachable means on the hub member and engaging said bearing and thereby securing the hub member against axial movement.

2. The combination of a supporting member, a spindle provided with a flange and having one end secured in said member, a roller bearing on said spindle and held between said supporting member and said flange, an axially movable roller bearing axially movable on the free end of said spindle, a hub member mounted on said bearings and provided with an end wall inclosing the free end of the spindle, and coöperating abutments engaging the first-mentioned roller bearing to secure the hub member on the spindle, one of said abutments being detachable to permit removal of the hub member from said bearings.

In testimony whereof I affix my signature in presence of two witnesses.

RUSSELL HUFF.

Witnesses:
LE ROI F. WILLIAMS,
CHAS. J. FITZSIMONS.